Patented Aug. 15, 1933

1,922,428

UNITED STATES PATENT OFFICE 1,922,428

APPARATUS FOR SMELTING ALUMINUM

John G. G. Frost, Cleveland, Ohio, assignor to The National Smelting Company, Cleveland, Ohio, a Corporation of Ohio Original application May 27, 1930, Serial No. 456,181. Divided and this application April 18, 1931. Serial No. 531,083

12 Claims. (Cl. 266—18)

This invention relates to apparatus for recovering the metallic aluminum content of finely divided material such as borings, turnings, skimmings, dross, and the like, wherein the major portion of such aluminum content is recovered directly in molten form by the utilization of heat from an exothermic reaction.

This application is a division of my copending application Serial No. 456,181 filed May 27, 1930, for process of smelting aluminum.

An object of the invention is to provide advantageous apparatus for an economical process for the recovery of the aluminum content of material containing metallic aluminum in particles of relatively small mass, such as borings, skimmings, and the like. Further objects are to provide apparatus for such a process wherein the major portion of the aluminum may be recovered directly in molten form and wherein the recovery of aluminum may be continuous. Other objects are to provide apparatus of unique and advantageous structural and operational characteristics into which gaseous chlorine and solid aluminiferous material may be introduced and caused to react rapidly and efficiently, and in which apparatus the products of reaction may be readily and substantially completely recovered.

Other objects of the invention will be apparent to those skilled in the art from the disclosures herein made.

Briefly, my invention contemplates apparatus for the recovery of aluminum from material containing small particles of metallic aluminum by causing chlorine to react with sufficient proportion, at least five percent, of the aluminum in said material to cause the generation of sufficient heat to melt the remainder of the metallic aluminum in said material, the heat being produced as a result of the exothermic nature of the reaction between aluminum and chlorine.

The invention further contemplates apparatus for advantageously causing the coalescence of the resulting distributed globules of molten aluminum into a body of molten metal which may be readily separated from the residue of solid material. A chamber from which the atmosphere is substantially completely excluded is preferably provided, in order to prevent oxidation of said aluminum. Condensing means is provided whereby the gaseous aluminum chloride resulting from the reaction between the chlorine and aluminum may be condensed and recovered.

Figure 1:
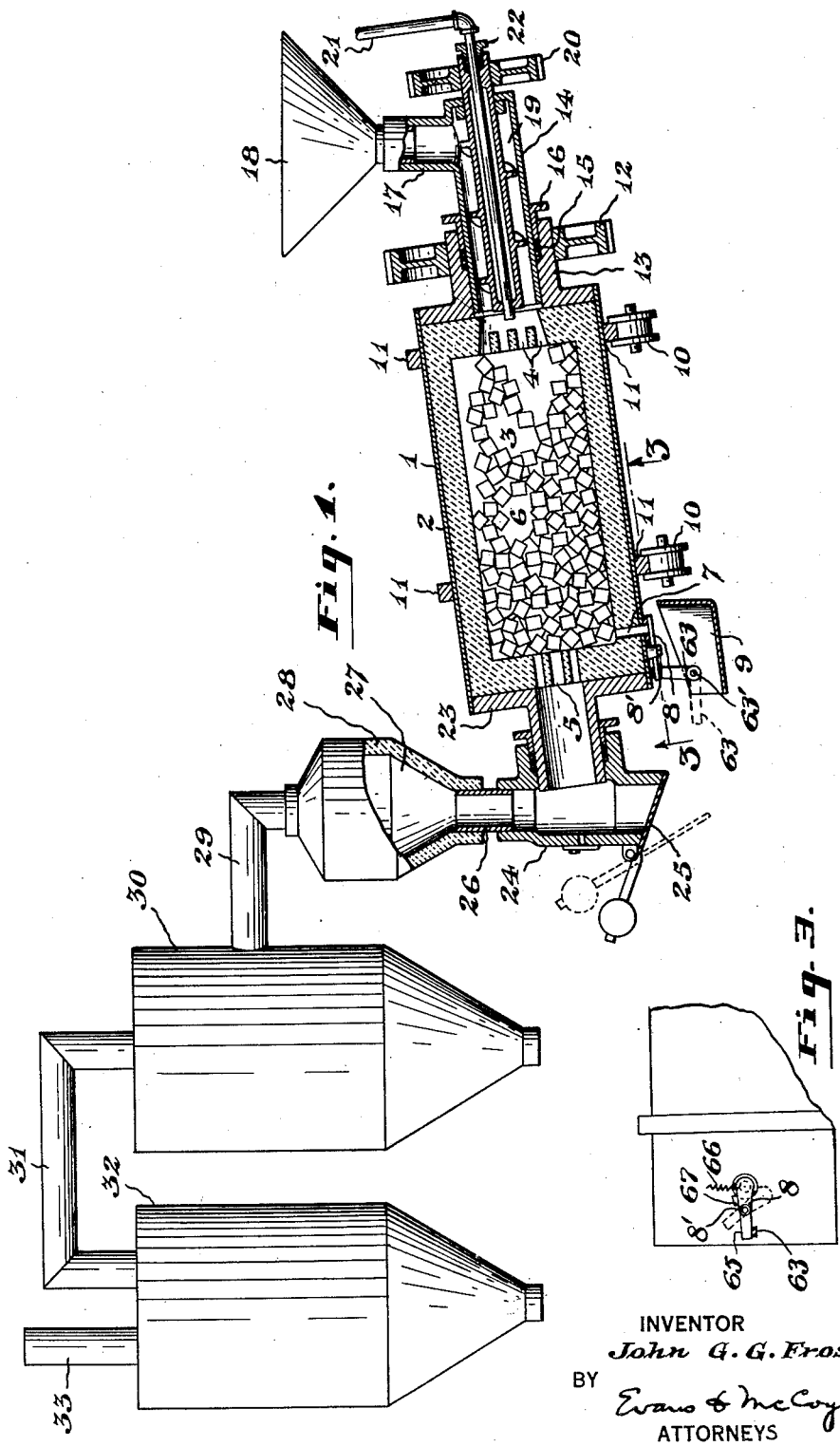
Figure 2:
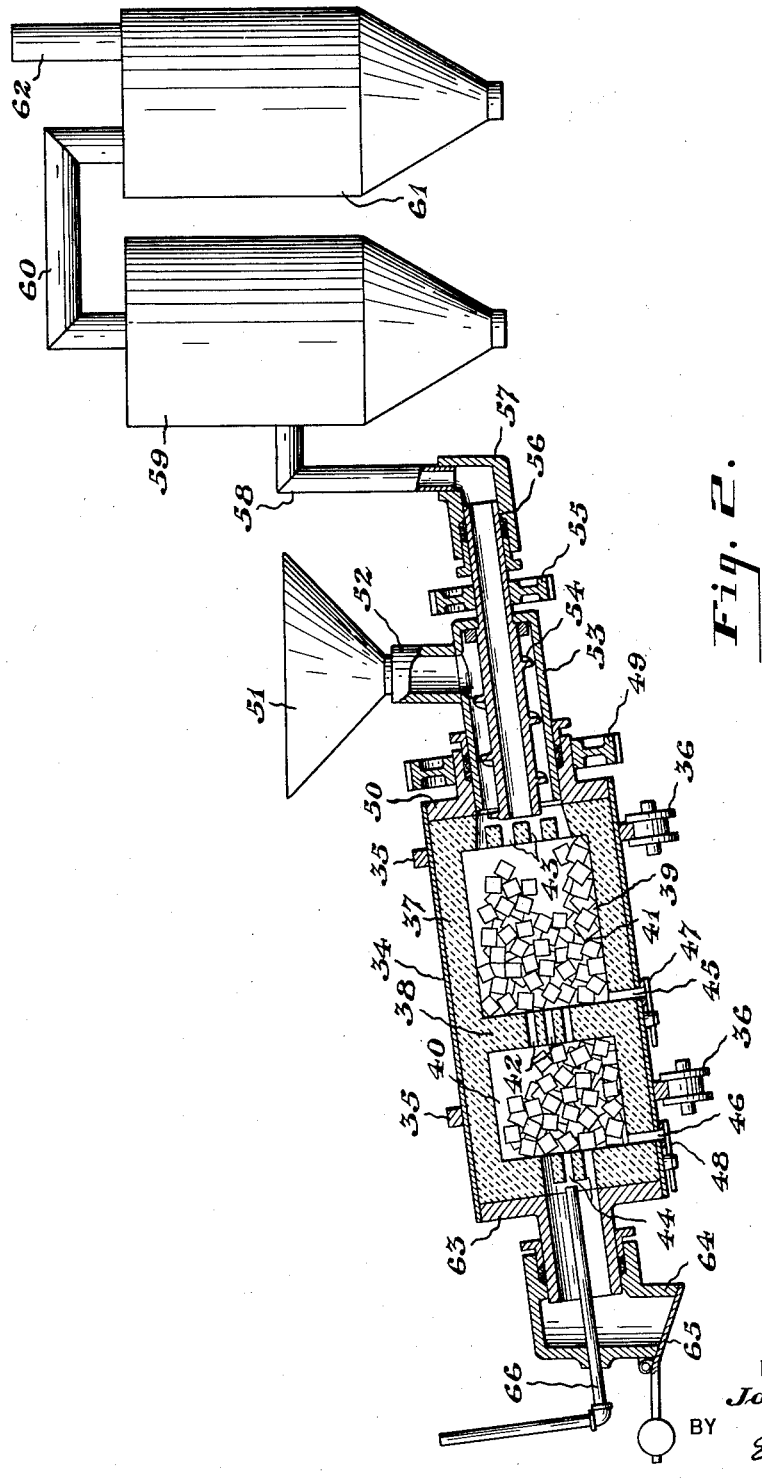

In the drawings, Figure 1 is a diagrammatic view partly in section of one form of apparatus contemplated by my invention;

Fig. 2 is another diagrammatic view partly in section ilustrating a modified form of apparatus embodying my invention; and Fig. 3 is a segmental view on the line 3—3 of Fig. 1.

One form of apparatus in which my invention may be carried out is illustrated diagrammatically in Fig. 1 wherein is shown an inclined rotatable drum 1 having a lining 2 of which the inner portion at least is of refractory material. The lining 2 may include additionally material of insulating nature, such as infusorial earth. The lining 2 is of sufficient heat-insulating nature to maintain the interior of the drum above the melting point of aluminum. The lining 2 encloses a reaction chamber 3 which is shown as substantially filled with loose brick or equivalent material. The drum 1 is provided with grilled openings 4 and 5 which are arranged to retain the brick 6 within the reaction chamber. A tap hole 7 is provided near the lower end of the drum to permit molten aluminum to be withdrawn periodically. The tap hole is provided with a suitable cover 8 rotatably mounted on suitable pins or studs 8′ so that the cover may be manipulated manually, or automatically by suitable tripping means as shown in Figs. 1 and 3 of the drawing. A trough 9 is shown disposed beneath the tap hole to receive molten aluminum and direct the same into any suitable receptacle.

The drum 1 is arranged to rotate on rollers 10 cooperating with the trunnions 11 affixed to the drum. The rotation of the drum is accomplished by suitable actuating means cooperating with the gear 12 affixed to the collar 13 shown at the upper end of the drum.

Means for introducing aluminum-containing material and chlorine into the reaction chamber 3 are shown adjacent the upper end of the drum 1. Thus, the stationary housing 14 cooperates in gas-tight relation to the collar 13 by means of the packing 15 and gland 16. The housing 14 is shown as provided with an upstanding section 17 and funnel 18. Within the housing 14 a hollow conveyor 19 is arranged to be rotated by the gear 20 and any suitable actuating means. A chlorine tube 21 is arranged to extend through the hollow conveyor 19 into the upper end of the drum. The chlorine tube 21 is secured in gas-tight relation to the conveyor 19 by suitable packing means 22. If desired, the end of the chlorine tube adjacent the reaction space 3 may be made of silica or other heat resisting material.

A collar 23 is secured to the lower end of the drum 1, this collar extending in gas-tight relation into the housing 24, the bottom of which is provided with a trippable cover 25. The housing 24 is secured by means of a member 26 to a condenser 27 which may be provided with an insulating cover 28 to permit of the condensing only of the less volatile undesired reaction products. The condenser 27 is in turn secured by a conductor 29 to a condenser 30, conductor 31, condenser 32, and an outlet pipe or vent 33.

In Fig. 2, I have shown a modified form of apparatus arranged for counter-current flow of chlorine and aluminum-containing material, and further provided with a plurality of reaction chambers and a plurality of tap holes for the removal of molten aluminum. In Fig. 2 there is shown a drum 34 provided with trunnions 35 for rotation on the rollers 36. The drum 34 is provided with an insulating lining 37 and an apertured partition 38 separating the drum into two reaction chambers 39 and 40, each of which chambers is shown as substantially filled with brick 41 or equivalent material. The aperture 42 in the partition 38 and the apertures 43 and 44 in the upper and lower ends of the drum are grilled in order to retain the brick 41 within the respective chambers.

Tap holes 45 and 46 are provided in the chambers 39 and 40, and tap hole covers 47 and 48 are provided on the exterior of the drum, which covers may be operated manually or by any suitable tripping means, such as that shown in Figs. 1 and 3 of the drawings.

The drum 34 may be rotated by suitable means actuating the gear 49 secured to the collar 50 at the upper end of the drum.

Aluminum-containing material may be introduced into the hopper 51 cooperating with the upstanding extension 52 of the stationary housing 53, which in turn cooperates in gas-tight relation with the upper end of the drum. A hollow conveyor 54 extends through the housing 53 and is arranged to introduce material into the drum 34 at a desired rate by suitable actuation of the gear 55. The extension 56 of the conveyor 54 cooperates with the member 57 and communicates through the hollow conductor 58 with the condenser 59 and through the conductor 60 to the condenser 61, a vent or outlet pipe 62 being provided in the condenser 61. The connections of the conveyor 54 with the housing 53 and member 57 are gas-tight in order to prevent air leakage into the drum 34.

A collar 63 is secured to the lower end of the drum and cooperates in gas-tight relation with the discharge housing 64 which is provided with a trippable closure 65. A chlorine conductor tube 66 extends through the housing 64 and into the lower end of the drum 34. The inner end of the conductor tube 66 may be of silica or other heat resisting material.

Fig. 3 of the drawings illustrates more clearly how the cover 8 is mounted on the stud or pin 8' so that the cover may be manually operated.

Figs. 1 and 3 of the drawings illustrate means for automatically manipulating the cover so as to permit the aluminum to be withdrawn during each revolution of the drum. This is accomplished by rotatably maintaining a standard 63 in a shaft journaled in the sides of the trough 9. When the standard is in upright position, as shown in full lines of Fig. 1 of the drawing, and the drum is being rotated, the outwardly extending arm 65 of the cover 8 will come in contact with the standard and will force the cover open against the action of the spring 66. After the drum has rotated past the standard, the spring 66 will operate to return the cover to its normal closed position. A lug 67 is provided to prevent the cover from being drawn beyond the tap hole. In some cases, it will probably not be desirable to open the tap hole during each rotation of the drum. In such case the standard may be manually rotated in position to trip the cover at desired intervals, or the cover may be opened by applying manual pressure directly to the arm 65 against the action of the spring 66. After the molten metal has been withdrawn, the pressure may be removed and the cover will return to its normal position.

In carrying out my process in the manner indicated in Fig. 1, material containing metallic aluminum in relatively small particles, such as borings, turnings, grindings, skimmings, dross and the like, is charged into the hopper 18 whence it falls into the housing 14 and is conveyed at a desired rate into the rotating drum 1. Chlorine is simultaneously fed to the reaction chamber through the chlorine tube 21. At the commencement of the operation the reaction chamber is preferably heated to at least 200° C. in any suitable manner in order that the reaction between aluminum and chlorine may proceed at a relatively rapid rate. This may be accomplished by removing the housing 14, together with the conveyor, and heating the chamber by means of a gas flame. The proportion of chlorine to the metallic aluminum content of the material being treated is such that at least about five percent of the aluminum content will be transformed into aluminum chloride in order that sufficient exothermic heat may be produced from the reaction to maintain the reaction chamber at a temperature above the melting point of aluminum. The proportions of chlorine to aluminum may, of course, be widely varied, depending upon the amount of aluminum chloride which may be desired as a by-product.

By reason of the action of the bricks 6 the aluminum containing material is thoroughly distributed throughout the reaction space, and fresh surfaces or reaction are exposed. Furthermore, the chlorine is caused to take a tortuous path through the reaction chamber whereby thorough reaction of the chlorine may take place relatively uniformly throughout the reaction chamber in order that the exothermic heat may be uniformly distributed. The bricks 6 have a further very important function of producing what may be termed a rubbing action on the molten small particles of aluminum to cause the coalescence thereof into a sufficiently large mass to form a pool of aluminum at the lower end of the drum which may be drained off through a tap hole 7 at desired intervals. Depending upon the particular circumstances, the molten aluminum thus drawn off may be cast directly, formed into ingots, or alloyed with other materials.

The residual material from the reaction passes out of the drum through the lower end thereof, and may be removed and suitably disposed of through the discharge chamber 24.

Since the aluminum-containing material to be treated frequently contains such impurities as tin, lead, iron and other metals, there will frequently be formed besides gaseous aluminum chloride the chlorides of the aforementioned impurities. The chlorides of the common impurities are usually less volatile than aluminum chloride. The chlorides formed by the reaction, gaseous at the temperature of the reaction chamber, pass outwardly through the lower end of the reaction chamber up into the condenser 27 wherein the less volatile products such as lead and copper chlorides may be condensed and removed through the lower discharge chamber 24. The remaining products, such as aluminum chloride and iron chloride, may pass successively through the condensers 30 and 32, whereby the iron chloride is first condensed and the pure aluminum chloride may be recovered in the second condenser 32, any remaining uncondensed products passing out of the system through the discharge pipe 33, the condensed chlorides being removed from the condensers 30 and 32 through the lower ends thereof.

The manner of carrying out my process with the apparatus shown in Fig. 2 differs from that described with reference to Fig. 1 mainly in that the counter-current flow of materials is employed. The aluminum-containing material is disposed in the hopper 51 and is fed by the hollow conveyor 54 into the reaction chamber 39 at the upper end of the drum 34. The chlorine is fed through the tube 66 into the reaction chamber 40 of the drum 34. In this manner the fresh chlorine reacts with the most nearly exhausted aluminum-containing material, and the fresher aluminum-containing material reacts with the more nearly exhausted chlorine, whereby the reaction may be somewhat more efficiently carried out. The reaction space is divided into upper and lower chambers 39 and 40, and the molten aluminum formed in each one is separately drawn off through the tap holes 45 and 46. The gaseous products of reaction, namely, aluminum chloride and the chlorides of impurities, pass out of the upper end of the reaction chamber through the hollow conveyor 54 and into the condensers 59 and 61. In this case, it will be noted that I have omitted an insulated first condenser, as shown in Fig. 1. Where the composition of the aluminum-containing material to be treated is such that a few low volatile gaseous impurities are formed, the insulated first condenser may be omitted.

The residue from the aluminum-containing material passes out of the lower end of the drum and may be removed through the discharge housing 64.

It will be seen that I have provided novel and advantageous apparatus wherein the major portion of the aluminum content of aluminum-containing material may be recovered in the form of molten aluminum, and the remainder of the aluminum recovered in the form of a valuable by-product.

It will further be noted that I have provided economical and advantageous apparatus for use in a process of recovering aluminum in molten form, which process provides its own heat for the carrying on thereof.

It will also be seen that by my improved apparatus material containing aluminum in relatively small particles may be treated and the aluminum content of such material melted and coalesced into a body of molten aluminum with the attendant advantages resulting from this direct recovery of the aluminum in molten form.

It will further be seen that by means of my improved apparatus the reaction between chlorine and aluminum-containing material may be carried out under non-oxidizing conditions, and furthermore the exothermic heat from such reaction may be conserved to melt additional aluminum, which molten aluminum may be readily coalesced and recovered. My improved apparatus further provides means for continuously supplying aluminum-containing material to the reaction chamber and for continuously removing gaseous reaction products, whereby a continuous process with attendant advantages readily may be carried out.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In apparatus for the recovery of aluminum, a rotatable drum, means for retaining heat within said drum, means for causing a crushing action on material within said drum during the rotation thereof, means for introducing aluminiferous material into said drum from the upper end thereof including a conveyor having a hollow tube, and means for introducing chlorine into said drum.

2. In apparatus for the recovery of aluminum, a tilted rotatable drum, means for causing a continuous crushing action on material within said drum during the rotation thereof, means for introducing aluminiferous material including a conveyor having a hollow tube, and means for introducing chlorine into the upper end of said drum during the rotation thereof comprising a conduit extending through said tube.

3. In apparatus for the recovery of aluminum, a rotatable drum enclosing a reaction chamber, a stationary conveyor housing mounted adjacent one end of said drum in substantially gas-tight relation thereto, a hopper communicating with said housing whereby aluminum-containing material may be supplied to said housing, a conveyor having a hollow shaft mounted in said housing, a chlorine conduit in said hollow shaft extending into said reaction chamber, the inner portion of said chlorine conduit being composed of refractory material.

4. In apparatus for the recovery of aluminum, a rotatable drum enclosing a reaction chamber, a rotatable conveyor adjacent one end of said drum to feed aluminum-containing material into said reaction chamber, means for introducing chlorine into said reaction chamber, said drum and conveyor being independently rotatable at desired speeds whereby aluminum-containing material may be fed to said reaction chamber at a desired rate and whereby said material may be caused to flow through said reaction chamber at such a rate as to obtain substantially complete reaction of said aluminiferous material with said chlorine.

5. In apparatus for the recovery of aluminum from solid aluminum-containing material, in combination, a rotatable inclined drum, a refractory lining within said drum, means dividing the interior of said drum transversely into a plurality of reaction chambers, openings in said drum and refractory lining adjacent the lower end of each chamber permitting the withdrawal of molten aluminum therefrom, each reaction chamber being substantially filled with loose refractory crushing members, openings at the upper and lower ends of said drum and in said refractory dividing means small enough to retain said crushing members within the respective chambers and large enough to permit the passage of aluminum-containing material downwardly through said reaction chambers and the discharge of reaction residue from the lower end of the drum, a stationary conveyor housing associated in substantially gas-tight relation with the upper end of said drum, a conveyor in said conveyor housing for introducing aluminum-containing material into said drum, a stationary housing associated in substantially gas-tight relation with the lower end of said drum arranged to receive reaction residue, and means for introducing chlorine into said reaction chambers.

6. Apparatus for the recovery from finely divided material of the metallic aluminum content thereof in the form of molten aluminum chloride, said apparatus comprising, in combination, a rotatable inclined heat-retaining reaction drum, means within said drum to exert a crushing action on aluminum-containing material and a coalescing action on small particles of molten metal, operable means for permitting the molten metal to flow from said drum while said drum is rotating, a stationary conveyor housing associated in substantially gas-tight relation with the upper end of said drum, a conveyor within said housing arranged to supply aluminum-containing material to said drum, means for introducing chlorine into said drum during the rotation thereof, a stationary housing associated in substantially gas-tight relation with the lower end of said drum arranged to receive reaction residue and gaseous reaction products, means for permitting the withdrawal of solid reaction residue from said housing, and means communicating with said housing for condensing gaseous reaction products.

7. Apparatus for the recovery of finely divided material of the metallic aluminum content thereof in the form of molten aluminum and aluminum chloride, said apparatus comprising, in combination, a rotatable inclined heat-retaining reaction drum, means within said drum to exert a crushing action on aluminum-containing material and a coalescing action on small particles of molten metal, operable means for permitting the molten metal to flow from said drum while said drum is rotating, a stationary conveyor housing associated in substantially gas-tight relation with the upper end of said drum, a conveyor within said housing arranged to supply aluminum-containing material to said drum, a stationary condensing means for gaseous reaction products communicating in substantially gas-tight relation with the upper end of said drum, means associated in substantially gas-tight relation with the lower end of said drum for withdrawing solid reaction residue from said drum, and means for introducing chlorine into the lower end of said drum during the rotation thereof.

8. Apparatus for the recovery from finely divided material of the metallic aluminum content thereof in the form of molten aluminum and aluminum chloride, said apparatus comprising, in combination, a rotatable inclined drum, a refractory lining within said drum arranged to define a reaction chamber, said reaction chamber being substantially filled with loose refractory crushing and coalescing members, said drum being provided with grilled openings at the upper and lower ends thereof large enough to permit the entry of aluminum-containing material and the discharge of reaction residue, respectively, and small enough to retain said loose refractory members within said reaction chamber, said drum and refractory lining being apertured to provide a tap hole communicating from the lower portion of the reaction chamber to the exterior of the drum, a trippable cover for said tap hole on the exterior of said drum to permit withdrawal of molten aluminum, a stationary conveyor housing associated in substantially gas-tight relation with the upper end of said drum, a hopper communicating with said conveyor housing to introduce aluminum-containing material thereinto, a hollow screw type conveyor rotatable within said conveyor housing, a chlorine tube associated in substantially gas-tight relation with said conveyor housing and conveyor and extending through said hollow conveyor and arranged to introduce chlorine into said reaction chamber, a stationary housing associated in substantially gas-tight relation with the lower end of said drum arranged to receive reaction residue and gaseous reaction products and means for permitting the withdrawal of solid reaction residue from said housing.

9. Apparatus for the recovery from finely divided material of the metallic aluminum content thereof in the form of molten aluminum and aluminum chloride, said apparatus comprising, in combination, a rotatable inclined drum, a refractory lining within said drum arranged to define a reaction chamber said reaction chamber being substantially filled with loose refractory crushing and coalescing members, said drum being provided with openings at the upper and lower ends thereof large enough to permit the entry of aluminum-containing material and the discharge of reaction residue, respectively, and small enough to retain said loose refractory members within said reaction chamber, said drum and refractory drum lining being apertured adjacent the lower end of the reaction chamber to provide an opening for withdrawal of molten aluminum, a trippable cover for said opening, a stationary conveyor housing associated in substantially gas-tight relation with the upper end of said drum, a hopper communicating with said conveyor housing to introduce aluminum-containing material thereinto, a hollow screw-type conveyor rotatable within said housing, a stationary member associated in gas-tight relation with the upper end of said hollow screw conveyor, condensing means for gaseous reaction products communicating with said stationary member, the hollow interior of said conveyor communicating at its lower end with said reaction chamber and at its upper end with said condensing means, a stationary housing associated in substantially gas-tight relation with the lower end of said drum arranged to receive solid reaction residue, means for permitting the withdrawal of solid reaction residue from said housing, and a chlorine tube arranged to introduce chlorine into the lower end of said reaction chamber.

10. In apparatus for the recovery of aluminum, a rotatable drum, means for introducing aluminiferous material into said drum, including a conveyor having a hollow tube connected in air-tight relationship with said drum, and means for introducing chlorine into said drum comprising a conduit which is also in air-tight relationship therewith.

11. In apparatus for the recovery of aluminum, a rotatable drum, means for introducing aluminiferous material into said drum, including a conveyor connected in air-tight relationship with said drum, and means for introducing chlorine into said drum comprising a conduit which is also in air-tight relationship therewith, and operable means for intermittently permitting the molten aluminum to flow from said drum during the rotation thereof.

12. In apparatus for the recovery of aluminum, a rotatable drum, means whereby aluminiferous material and chlorine may be simultaneously introduced and brought into active association said drum, an operable means for intermittently permitting the molten aluminum to flow from said drum during rotation thereof.

JOHN G. G. FROST.

CERTIFICATE OF CORRECTION.

Patent No. 1,922,428.

August 15, 1933.

JOHN G. G. FROST.

It is hereby certified that error appears in the printed specification of the above numbered patent requiring correction as follows: Page 2, line 17, after "48" insert the words "rotatably mounted on suitable pins or studs"; page 4, line 145, claim 12, after "association" insert "in", and for "an" read "and"; and that the said Letters Patent should be read with these corrections therein that the same may conform to the record of the case in the Patent Office.

Signed and sealed this 19th day of September, A. D. 1933.

(Seal)

M. J. Moore.
Acting Commissioner of Patents.